United States Patent

Bianchini

[11] Patent Number: 5,531,180
[45] Date of Patent: Jul. 2, 1996

[54] DEVICE SERVING AS INDICATOR OF THERMAL HISTORY ESPECIALLY FOR FROZEN PRODUCTS AND THE LIKE

[75] Inventor: Marco Bianchini, Rome, Italy

[73] Assignee: Consiglio Nazionale delle Ricerche, Rome, Italy

[21] Appl. No.: 331,551

[22] PCT Filed: May 7, 1993

[86] PCT No.: PCT/IT93/00046

§ 371 Date: Nov. 7, 1994

§ 102(e) Date: Nov. 7, 1994

[87] PCT Pub. No.: WO93/22638

PCT Pub. Date: Nov. 11, 1993

[30] Foreign Application Priority Data

May 7, 1992 [IT] Italy ................................ RM92A0343

[51] Int. Cl.⁶ ................................ G01K 1/02; G01K 3/00
[52] U.S. Cl. .......................... 116/216; 116/218; 374/102; 374/160; 426/88
[58] Field of Search ..................... 116/217, 218, 116/281, 324, 216; 374/102, 160; 426/87, 88

[56] References Cited

U.S. PATENT DOCUMENTS

| | | | |
|---|---|---|---|
| 2,788,282 | 4/1957 | Hammond, Jr. | 116/218 |
| 2,915,405 | 12/1959 | Hammond, Jr. et al. | 116/218 |
| 3,656,452 | 4/1972 | Kliewer | 116/218 |
| 3,820,499 | 6/1974 | Kliewer et al. | 116/217 |
| 3,965,741 | 6/1976 | Wachtell et al. | 116/217 |
| 4,143,617 | 3/1979 | Youngren | 374/160 |
| 4,509,449 | 4/1985 | Chalmers | 116/218 |

FOREIGN PATENT DOCUMENTS

| | | | |
|---|---|---|---|
| 2100043 | 3/1972 | France | 116/218 |
| 8031834 | 5/1983 | WIPO | |

Primary Examiner—William A. Cuchlinski, Jr.
Assistant Examiner—Andrew Hirshfeld
Attorney, Agent, or Firm—Browdy and Neimark

[57] ABSTRACT

A device for indicating a time-temperature thermal history of a refrigerated product over a specific temperature range. The device includes a container having a high-viscosity fluid therein, the fluid remaining in either a liquid or gaseous state over the entire specific temperature range. A mobile portion moves within the fluid as a result of a return force of an elastic component. The displacement of the mobile portion indicates the time-temperature thermal history of the product over the specific temperature range.

15 Claims, 2 Drawing Sheets

DEVICE SERVING AS INDICATOR OF THERMAL HISTORY ESPECIALLY FOR FROZEN PRODUCTS AND THE LIKE

TECHNICAL FIELD

The invention concerns a device useful as an indicator of thermal history, particularly for frozen products and the like.

It is common knowledge that frozen foodstuffs should be kept at a predetermined low temperature, such as −18° C., for instance, within a comparatively narrow range, and should not in any case be thawed and frozen again. At present no means is available to check the actual thermal history of frozen products, namely frozen foodstuffs and the like. The consumer therefore must choose the goods from the frozen food section in food stores and cannot check the thermal history of the goods. Purchasers can only rely on notions of "confidence" totally deprived of any scientfic relevance. The same problem applies to a number of other items such as pharmaceutical products which must be kept at a temperature much lower than room temperature to retain their effectiveness.

As far as these products are concerned there are no known means of telling first hand whether the pharmaceutical product has been exposed to temperature rises which might impare its properties.

INDUSTRIAL APPLICABILITY

The purpose of the present invention is to provide an indicator of thermal history especially designed for frozen products and the like, which shows whether the product has gone through a rise in temperature in excess of the standards specified by the manufacturer, and might provide information concerning the time and the exposure to temperature variations in excess of the temperature recommended for a proper preservation.

It is well known that the above products can be exposed to temperature rises without ever exceeding 0° C. and retain, at least seemingly, their frozen state; however if at −18° C. undesired biological processes are practically stopped, at −3° or −4° C. such biological processes can take place, their occurrence being also a function of the time of exposure to a temperature higher than the recommended one, which as pointed out earlier is of about −18° C.

DISCLOSURE OF THE INVENTION

The aim of the present invention is therefore to provide a device which displays the thermal history of frozen products, and that gives an indication of the time of exposure to a temperature higher than the recommended temperature.

According to the present invention, there is provided a device based on the cooperation between an elastic element pre-loaded when the device is triggered and a fluid material with a controlled viscosity, which is a function of temperature; so that the indicator combined with the elastic member immediately shows consumers whether the frozen product on sale has gone through "thermal mishandling" which makes it unfit for consumption.

The present invention shall now be described with reference to a preferred embodiment thereof, shown by way of example which should not in any way limit other possible embodiments; and according to the attached drawings, wherein:

MODE FOR CARRYING OUT THE INVENTION

Figure 1:
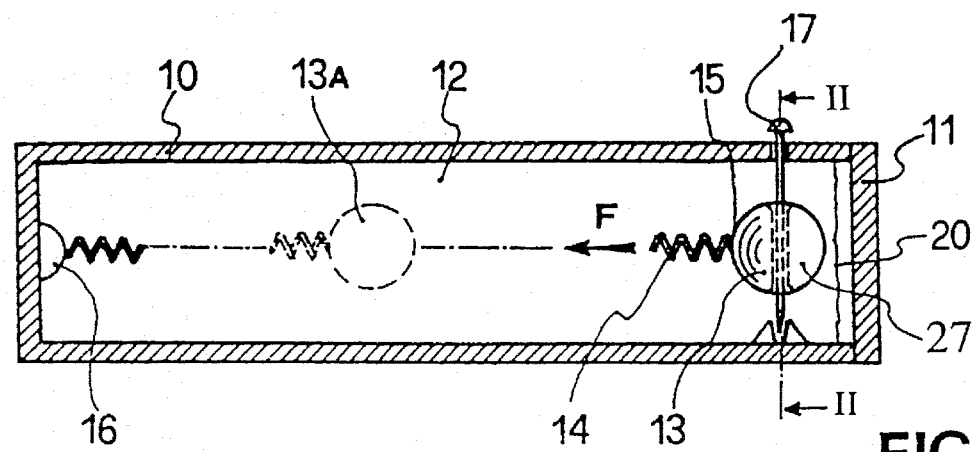
FIG. 1 shows a longitudinal section of a first embodiment of the device according to the above invention.
Figure 2:
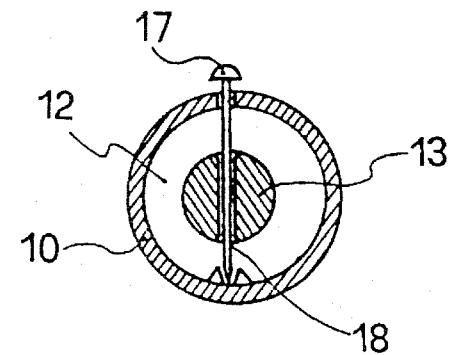
FIG. 2 shows a section along plane II—II of FIG. 1.

With reference to the drawings and in particular to FIGS. 1 and 2, the above device includes a case made of transparent material shown in 10 with a lid 11.

Within the case there is a mixture with a predetermined viscosity as a function of the temperature, as we shall explain more in detail.

Inside the case 10 there is provided an indicator 13 with a neutral buoyancy in the mixture (meaning that the weight and the buoyant force are equal so that the indicator neither tends to rise nor to sink while immersed), subject to pull force in the direction of the F arrow by means of a tension spring 14, anchored in 15 to the indicator 13 and in 16 to the left end of the case 10.

As shown in FIGS. 1 and 2, the member 13 is held in a position which is at the right of the case 10, by means of a metal "pin" 17, which goes through the wall of the case 10 and a hole 27 of indicator 13. The purpose of the pin will be explained later on.

An elastic gasket can be positioned in the area which is to be crossed by the pin 17, and will serve as a self-healing sealing element to prevent leakage of fluid after removal of the pin 17, after thawing.

The gasket, not shown in the figures for the sake of simplicity, will consist of an elastomer which preserves the self-healing sealing properties after exposure to low temperature. A suitable material could be a silicone-type elastomer. The above also applies to the embodiments given in FIGS. 3 and 4 which will be discussed later.

Figure 3:
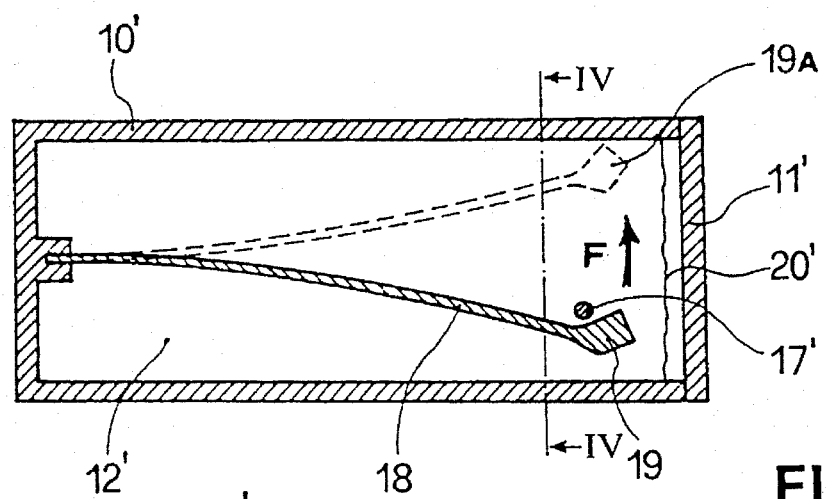
FIG. 3 shows a longitudinal section of a second embodiment of the device in question.
Figure 4:
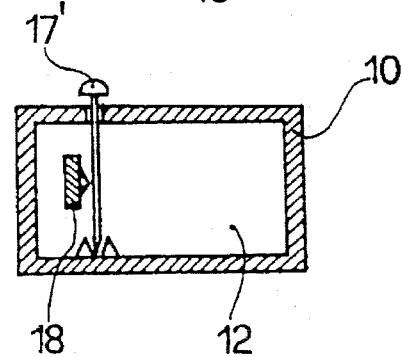
FIG. 4 shows a section along plane IV—IV of FIG. 3.

FIGS. 3 and 4 show a second embodiment of the device in question. The parts corresponding to those in FIGS. 1 and 2 will be marked with the same reference numbers.

In the embodiment shown in FIGS. 3 and 4, the spiral spring 14 of FIG. 1 is replaced by a leaf spring, 18 which carries at the end an indicator 19.

At the initial stage of the assembly, the cases 10 and 10' are rotated by 90° when compared with FIGS. 1 and 3 and are filled with the fluid 12 and 12' of the kind specified below, up to a level of 20, 20', respectively. The lid, 11, 11' is then fastened by means of thermal welding or similar techniques.

At this stage the indicator 18, 19 will be in the position shown in the figure.

For its practical use the case 10, 10' is firmly fastened to the frozen foodstuff package or to the package to be frozen: standard freezing temperature is between −18° and −20° C.

Figure 5:
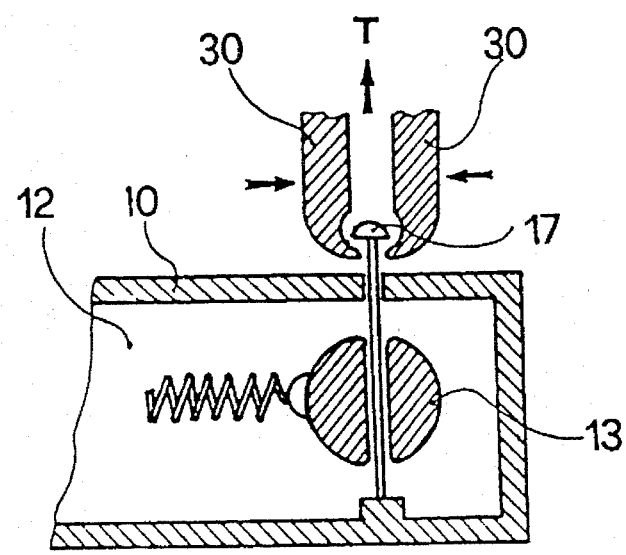
FIG. 5 shows a partial section view of a triggering tool for devices according to the invention.

Prior to shipping the frozen products provided with the device according to the invention, it should be "turned on". This can be achieved as shown in FIG. 5, i.e. by means of a tong-like device 30, to hold the pin head 17 pulling it in the direction of the arrow T, removing it and releasing the restraint on the indicator 13 (or 19 in FIG. 3).

According to the practical construction of the device, the removal of the "pin" 17 (17') is possible by simple mechanical force, or the pin 17 (17') could be made with copper or aluminum or other material with a high thermal conductivity, and the element 30 could be preheated to facilitate the removal of the pin 17 (17').

At this stage the device is turned on. As a result of the viscosity of the fluid or material 12 (12'), which is a function of temperature, with the elapsing of time, because of the pressure of spring 14 or 18, the indicator 13 or 19 will arrive at the position 13A, 19A respectively.

The viscosity of medium 12, 12' will be selected in such a way that if the thermal history of the frozen product and the indicator is according to the specified standard, the indicator 13, 19 will take the position 13A, 19A, at the end of the expected lifespan of the frozen product for which the proper cold chain has been maintained. In this case the time required for the indicator 13 to move to the position 13A is proportional to the viscosity and to the radius of the fluid friction surface (exterior surface) of the indicator 13 and inversely proportional to the elastic constant of the spring, which urges the indicator through the viscous medium; in the case of the indicator 19, the same proportionality holds except that, since the indicator 19 is not spherical, the radius must be replaced by an equivalent measure, for example the area perpendicular to the motion of the indicator 19 toward the position 19A.

In case of non compliance with the cold chain, the indicator will take the position 13A or 19A more or less rapidly according to the level of thermal mishandling the product has gone through, alerting the consumer as to the product's eligibility for consumption.

Figure 6:
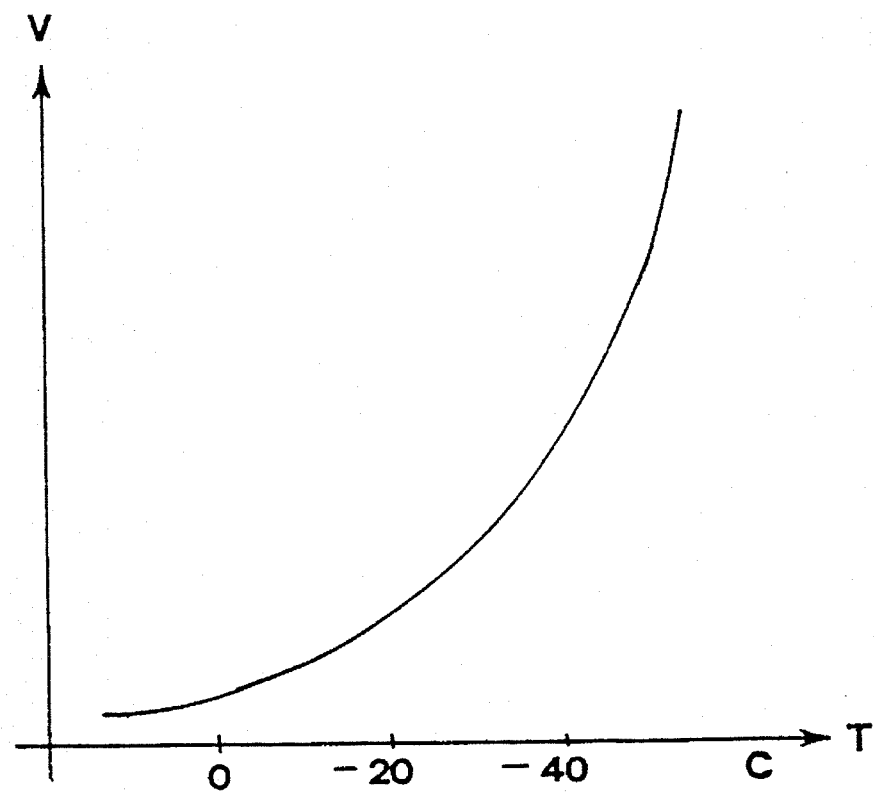
FIG. 6 shows a temperature/viscosity diagram of a component designed for use in the devices according to the invention.

Among the various mixtures of medium 12, 12' conceivable according to this invention, is recommended a mixture of glycerine and water 65% (0.5 Stokes at −20° C.), which is especially convenient on account of its lack of toxicity and a response which is substantially in keeping with the biological processes as qualitatively depicted in FIG. 6. The mixture must be of the type that will remain a liquid over the entire contemplated temperature range for which the indicating device will be used. This assures that the indicator can move within the fluid over the entire temperature range. This would not be the case with a fluid that may change to a solid in the contemplated temperature range.

Those who are experienced in this field will of course understand that a number of modifications could be envisaged in the practical implementation of the technical principle underlying this invention: elasticity constants of the springs, variations in space of "viscous action" addition of modifications of the mechanical set up to penalize differently deviations from the standard in the cold chain, and there could be alternative ways of turning on the device.

Moreover, the devices based on the technical principle underlying the invention could be applicable to fields other than frozen foodstuffs, such as pharmaceutical products. Even though we have shown applications related to given temperature ranges, it could apply to cryogenic temperatures or temperatures close to room temperature by selecting material whose viscosity is a function the temperature.

I claim:

1. A device for indicating a time-temperature thermal history of a refrigerated product, the thermal history being integrated over a contemplated temperature range of refrigeration of the product, the contemplated temperature range including a lowest contemplated temperature; the device comprising:

a container of non-opaque material;

a high-viscosity fluid disposed within the container, the fluid being in one of a liquid and a gaseous state at temperatures equal to and greater than the lowest contemplated temperature the viscosity of the fluid being dependent upon temperature;

a mobile portion having a controlled geometry and able to move about in the fluid as a result of a return force of an elastic component; and releasable holding means for retaining the mobile portion in a initial position at room temperature and at the lowest contemplated temperature; wherein within the contemplated temperature range the mobile portion, when released by the releasable holding means, moves slowly through the fluid under the force of the elastic component such that a displacement of the mobile portion from the initial position is a function of the viscosity of the fluid and a time interval elapsed since a time of release by the releasable holding means.

2. The device according to claim 1 characterized in that the mobile portion operates as an indicator which can be seen outside the container.

3. The device according to claim 2, characterized in that said holding means consists of a pin to be removed, positioned in such a way that the elastic component is mechanically stressed.

4. The device according to claim 2, characterized in that said elastic component includes a spring.

5. The device according to claim 4, characterized in that the mobile portion is of a definite size, fastened to said spring, consisting of a spiral spring, said mobile portion being made of a material with neutral buoyancy in the fluid.

6. The device according to claim 5, characterized in that said holding means consists of a pin to be removed, positioned in such a way that the elastic component is mechanically stressed.

7. The device according to claim 6, characterized in that said pin is removable by applying concurrently a pulling force and localized heat.

8. An indicator according to claim 4, characterized in that the mobile portion has a definite size and is fastened to the spring which is a leaf spring.

9. The device according to claim 8, characterized in that said holding means consists of a pin to be removed, positioned in such a way that the elastic component is mechanically stressed.

10. The device according to claim 9, characterized in that said pin is removable by applying concurrently a pulling force and localized heat.

11. The device according to claim 4, characterized in that said holding means consists of a pin to be removed, positioned in such a way that the elastic component is mechanically stressed.

12. The device according to claim 11, characterized in that said pin is removable by applying concurrently a pulling force and localized heat.

13. The device according to claim 1, wherein the holding means includes a pin to be removed, positioned in such a way that the elastic component is mechanically stressed.

14. The device according to claim 13, characterized in that said pin is removable by applying concurrently a pulling force and localized heat.

15. The device according to claim 1, wherein the viscosity of the fluid increases with decreasing temperature within the contemplated temperature range, down to the lowest contemplated refrigeration temperature.

* * * * *